UNITED STATES PATENT OFFICE.

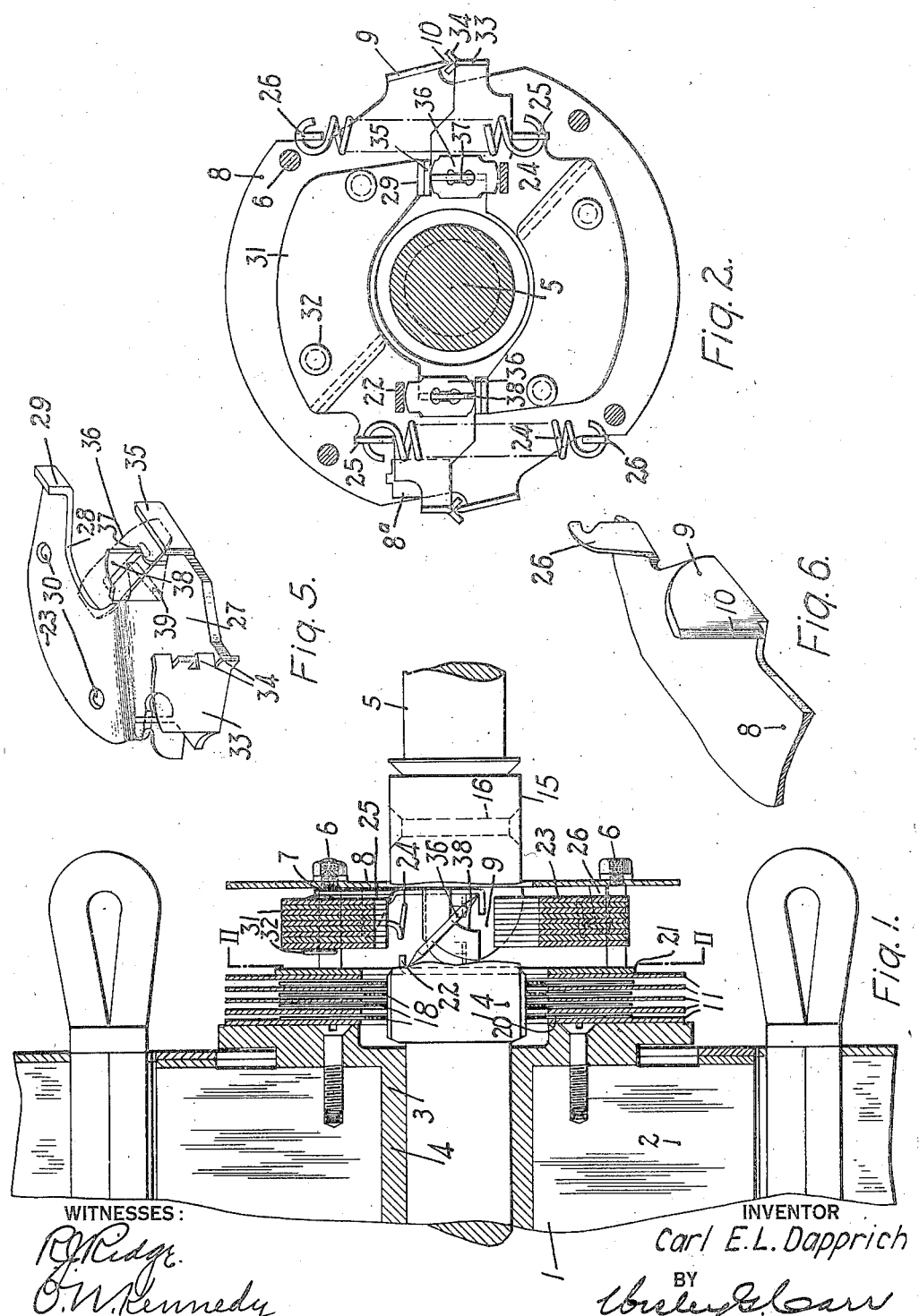

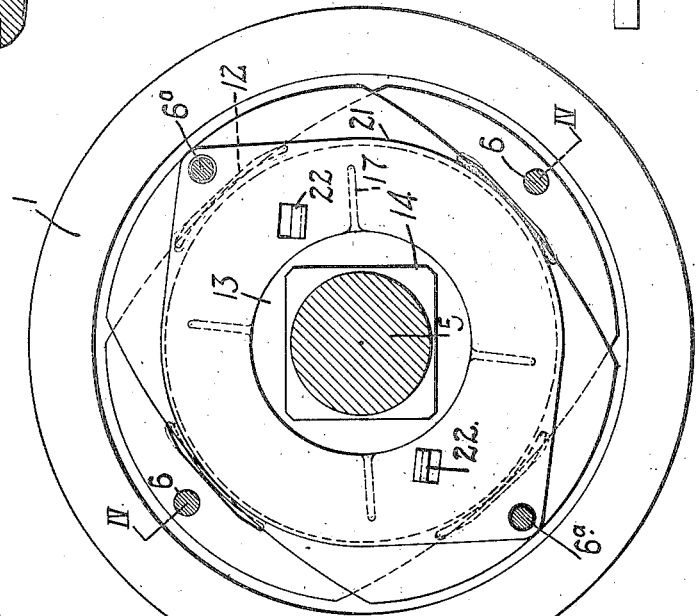

CARL EMIL LOUIS DAPPRICH, OF PITTSBURGH, PENNSYLVANIA, ASSIGNOR TO WESTINGHOUSE ELECTRIC AND MANUFACTURING COMPANY, A CORPORATION OF PENNSYLVANIA.

CENTRIFUGALLY-ACTUATED CLUTCH.

1,341,635.     Specification of Letters Patent.     Patented June 1, 1920.

Application filed January 18, 1915, Serial No. 2,830. Renewed September 14, 1917. Serial No. 191,500.

*To all whom it may concern:*

Be it known that I, CARL EMIL LOUIS DAPPRICH, a citizen of the United States, and a resident of Pittsburgh, in the county of Allegheny and State of Pennsylvania, have invented a new and useful Improvement in Centrifugally-Actuated Clutches, of which the following is a specification.

My invention relates to centrifugally actuated clutches and it has special reference to clutches that are adapted for use in connection with motors having small starting torque as, for example, single-phase induction motors.

One object of my invention is to provide a compact clutch structure that may be mounted within a very small space.

A further object of my invention is to provide a construction in which the friction per unit area of the engaging surfaces of the clutch members is materially reduced and in which the clutch-actuating means will be positive and reliable in operation.

It is well known that certain types of motors have small starting torque and, by reason of this fact, they are unable to start under any appreciable load. Centrifugally actuated clutches have been employed which connect the motor to the load after a predetermined speed is reached and a sufficient torque developed to enable the motor to operate. Such clutches, as heretofore constructed, have usually employed centrifugally actuated arms provided with surfaces which engage directly with corresponding surfaces connected to the load. This construction requires either heavily weighted arms or large friction surfaces and, in either case, the clutch mechanism must be relatively large in comparison to the amount of power transmitted. Furthermore, the direct engagement of the centrifugally actuated arms with the load requires that the friction per unit area of engaging surface must be relatively high which results in objectionable heating and distortion of the clutch members.

By my invention, I propose to avoid the above objections by arranging the centrifugally actuated members to operate levers and thus greatly increase the effect of their action which allows the size of the weights to be reduced. The friction surfaces are carried on members separated from the centrifugally actuated arms and, by the use of any desired number of individual plates, a relatively large area of friction surface is presented. A clutch so constructed may be used in connection with motors in which the available space in the end bell or inclosing casing is small for the ordinary construction. Furthermore, the wear of the engaging surfaces is reduced since the friction per unit area is much less and the life of the mechanism is correspondingly increased.

In a copending application, Patent No. 1,135,092, filed Mar. 7, 1913 by Andrew H. Bakken and assigned to the Westinghouse Electric & Manufacturing Company, a form of clutch mechanism is described in which the general principle of operation is similar to that embodied in the present invention. By my invention, however, I propose to make certain useful improvements in the above-described structure in order to render the clutch mechanism more efficient and satisfactory in operation. In place of the sliding jaws or planes used in the previous device, a toggle mechanism in which the actuating force is applied at one point has been substituted in order to eliminate the disturbing and retarding effects of friction encountered in the previous device. In addition, the pin pivot of the centrifugally actuated members has been changed to a rocking pivot with line contact for the reasons stated above. The friction disks carried by the rotor have been formed with portions thereof disposed in different planes in order to minimize the distortion or change in form due to the heat generated by the friction disks. Other equally important and useful improvements will be apparent, as hereinafter described.

In the accompanying drawings, Figure 1 is a longitudinal section of a portion of the rotor of an electric motor and the clutch mechanism attached thereto. Fig. 2 is a view, partially in elevation and partially in section, of the clutch and a motor shaft. Fig. 3 is a sectional view on the line II—II of Fig. 1. Fig. 4 is a view of a friction disk removed from the shaft. Figs. 5 and 6 are fragmentary perspective views of a centrifugally actuated member and its supporting plate. Fig. 7 is a fragmentary sectional view on the line IV—IV of Fig. 3, and Fig. 8 is a diagrammatic view of a modification of the toggle mechanism.

A rotor 1 of an electric motor that comprises a core 2 and a spider 3 having a hub 4 is rotatably mounted on a shaft 5 which may be connected to the load in any desired manner. The clutch structure is attached to the spider 3 by studs 6 that have shoulders 7 against which is clamped a plate member 8. The plate 8 is provided with portions 9 extending axially toward the rotor and having knife edges 10, as best shown in Fig. 6. Friction disks 11, of any desired number, are slidably mounted and alternately arranged on oppositely disposed pairs of studs 6 and 6ª, as best shown in Figs. 3 and 7. The plates 11 are rounded at their ends to conform to the outer circumference of the spider 3 and are provided with off-set portions 12 adjacent to the supporting studs 6. The plates 11 are further provided with concentric circular openings 13 to provide a clearance between the disks and the square portion 14 of a sleeve member 15 rigidly fixed to the shaft 5 by a suitable rivet or pin 16 or the square portion 14 may be formed integral with the shaft. Radial slots 17 are arranged about the opening 13. Friction disks 18 are provided with square central openings 19 which fit the square portion 14 of the sleeve 15 upon which they are mounted and are further provided with radial slots 20. The disks 18 are arranged alternately between the disks 11 and are of such diameter as to lie within the studs 6.

A substantially oval shaped plate 21 is slidably mounted on the studs 6ª adjacent to the outer disks 11 and is provided with axially extending projections 22, the purpose of which will be hereinafter set forth. Two lever arms 23, adapted to be actuated by centrifugal force, are pivoted on the knife edges 10 and are normally held in retracted position by springs 24 that are attached, respectively, to ears 25 on the arms 23 and to the ears 26 on the plate member 8. The lever arms 23, one of which is shown in detail in Fig. 5 severally comprise a base portion 27 and an off-set portion 28 lying in a plane parallel to that of the portion 27. The off-set portion 28 is provided with an upwardly extending projection 29 and holes 30 by means of which suitable weights 31 may be held in position and fastened by screws 32. The base portion 27 is provided with an upwardly extending portion 33 that is adapted to be in pivotal engagement with the knife edge 10 along a V-shaped notch formed by alternately arranged and oppositely disposed bent-out fingers 34. The spring 24 performs an additional function in holding the portion 33 in engagement with the knife edge. Bearing plates 8ª formed of phosphor bronze or any other suitable bearing metal are provided between portions 27 adjacent to the points of support and the plate 8. The base portion 27 is further provided with an axially extending projection 35 arranged in parallel relation with the corresponding projection 22 on the pressure plate 21. A lever 36, which consists of a member provided with a knife edge bearing on each end thereof, is pivotally held between the projections 22 and 35 and is provided with a central slot 37 adapted to receive a curved arm 38 of an upwardly extending portion 39 attached to the plate 8 and disposed in a plane perpendicular to that of the projections 22 and 35, and the pivoted lever 36, thereby maintaining the latter in proper relation to its points of pivotal support. A modification of this mechanism is shown in Fig. 8 wherein a suitable roller 40 is rotatably mounted on the pressure plate 21 and is adapted to engage a curved arm 41 mounted on the weight arm 23.

The operation of the clutch is as follows: When the motor is started, the rotor is not connected to the shaft 5. The disks 11 and 18 have no appreciable frictional engagement because no axial pressure is applied and the disks 11 carried by the rotor slip freely past the disks 18 which are mounted to rotate with the shaft 5. As the rotor gains in speed, the weighted levers 23 are thrown outwardly on their pivots 10 by centrifugal force and, as the projections 35 move outwardly, the levers 36 will tend to assume positions parallel to the axis of the motor shaft by reason of their joint pivotal support and the pressure plate 21 will be moved axially toward the rotor. The axial movement of the pressure plate 21 presses the friction disks 11 and 18 together with a force which increases with the speed of the motor. Owing to the large area presented for frictional engagement by the disks and the power multiplication secured by centrifugally actuated levers and the toggle actuated thereby, a comparatively small force upon the weights will cause the disks 11 and 18 to engage sufficiently to rotate the shaft 5 and carry the load. Since the connection between the disks is not a rigid one, the load will necessarily be taken up without shock.

As the weights fly upward, the ears 25, the ears 26 and the pivots 10 become more nearly in alinement so that the tension of the springs 24 is not materially increased during the latter portion of the outward movement of the levers 23. The clutch mechanism is therefore not entirely dependent upon an increase in speed to maintain the full working pressure on the disks. Consequently, this construction has the effect of diminishing the tendency to slip upon a slight decrease in the speed of the motor and the resultant retraction of the centrifugal levers by the springs.

The speed at which the clutch disks have sufficient frictional engagement to rotate the shaft 5 may be adjusted by varying the number of weights on the arms 23.

It is understood that such modifications may be made in the structural details and in the arrangement of parts as may come within the scope of the appended claims.

I claim as my invention:

1. In a centrifugally actuated clutch, the combination with a rotatable shaft, a base member carried thereby, and a plurality of levers mounted on said base member, of combined means for maintaining said levers in pivotal engagement with said base member and for opposing the pivotal movement of said levers when said shaft rotates.

2. In a centrifugally actuated clutch, the combination with a rotatable shaft, a base member carried thereby, and a plurality of levers mounted on said base member, of resilient members respectively performing the double function of maintaining said levers in pivotal engagement with said base member and of opposing the action of centrifugal force upon said levers when said shaft rotates.

3. In a centrifugally actuated clutch, the combination with a rotatable shaft, a base member carried thereby and provided with axially extending portions, a plurality of levers mounted on said base member and respectively provided with an axially extending portion, of springs attached to said base member and adapted to maintain the said axially extending portions in pivotal engagement and to oppose the pivotal movement of said levers.

4. In a centrifugally actuated clutch, the combination with a rotatable shaft, a base member carried thereby and provided with an axially extending knife-edge portion, a plurality of levers mounted on said base member and respectively provided with an axially extending V-shaped groove, of springs attached to said base member and adapted to maintain the said axially extending groove in engagement with said knife edge and to oppose the pivotal movement of said levers.

5. In a centrifugally-actuated clutch, the combination with a driving member and a driven member, of a plurality of coacting clutch members carried by each of said driving and driven members, a plurality of centrifugally-actuated members carried by said driving member, pivoted links respectively interposed between said clutch members and said centrifugally-actuated members and provided with knife-edge bearings at the ends thereof for compressing said clutch members.

6. In a centrifugally-actuated clutch, the combination with a driving member and a driven member, of a plurality of coacting clutch members carried by each of said driving and driven members and alternately arranged, a plurality of centrifugally-actuated members carried by said driving member, a plurality of toggle mechanisms comprising link members respectively interposed between said clutch members and said centrifugally-actuated members and provided with knife-edge bearings at the ends thereof, and projecting portions carried by said centrifugally-actuated members and engaging said knife-edge bearings for actuating said toggle mechanisms to compress said clutch members.

7. In a centrifugally actuated clutch, the combination with a driving member and a driven member, of a plurality of coacting clutch members carried by each of said driving and driven members and alternately arranged, a pressure plate mounted adjacent the outer clutch member, and means for compressing said clutch members comprising centrifugally actuated levers having radial movement, coacting projections on said pressure plate and said centrifugally actuated levers, and members interposed between said pressure plate and said centrifugally actuated levers and engaging the projections thereon by means of knife-edge bearings at the ends thereof.

In testimony whereof, I have hereunto subscribed my name this 12th day of January 1915.

CARL EMIL LOUIS DAPPRICH.

Witnesses:
M. W. BOSTMESS,
B. B. HINES.